US010282036B2

(12) United States Patent
Su et al.

(10) Patent No.: US 10,282,036 B2
(45) Date of Patent: May 7, 2019

(54) OPTICAL TOUCH SYSTEM AND IMAGE PROCESSING METHOD THEREOF

(71) Applicant: PIXART IMAGING INC., Hsin-Chu (TW)

(72) Inventors: Tzung Min Su, Hsin-Chu (TW); Ren Hau Gu, Hsin-Chu (TW); Chih Hsin Lin, Hsin-Chu (TW); Cheng Nan Tsai, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 254 days.

(21) Appl. No.: 15/346,082

(22) Filed: Nov. 8, 2016

(65) Prior Publication Data

US 2017/0052647 A1    Feb. 23, 2017

Related U.S. Application Data

(62) Division of application No. 13/495,712, filed on Jun. 13, 2012.

(30) Foreign Application Priority Data

Jun. 21, 2011 (TW) .............................. 100121547 A

(51) Int. Cl.
*G06F 3/00* (2006.01)
*G06F 3/042* (2006.01)
*G06F 3/041* (2006.01)

(52) U.S. Cl.
CPC .......... *G06F 3/0425* (2013.01); *G06F 3/0416* (2013.01)

(58) Field of Classification Search
None
See application file for complete search history.

(56) References Cited

U.S. PATENT DOCUMENTS 6,665,010 B1    12/2003 Morris et al.
6,671,422 B1    12/2003 Nakanishi
(Continued)

FOREIGN PATENT DOCUMENTS

CN    1711557 A    12/2005
CN    1932726 A    3/2007
(Continued)

OTHER PUBLICATIONS

Office Action from People's Republic of China Intellectual Property Office in the corresponding Chinese application 201110182510.1 dated Dec. 2. 2014, 9 pp. with partial English translation; and Search Report, 2 pp. in Chinese.
(Continued)

*Primary Examiner* — Delomia L Gilliard
(74) *Attorney, Agent, or Firm* — Juan Carlos A. Marquez; Marquez IP Law Office, PLLC

(57) ABSTRACT

An image processing method includes obtaining a background picture including a first and second pixel, wherein the first pixel has a first intensity value in response to that a first sensing element is operated by a fixed exposure time, and the second pixel has a second intensity value in response to that a second image sensing element is operated by the fixed exposure time; extracting the first and second intensity value from the first and second pixel, respectively; performing a computing operation including computing a first exposure time and a second exposure time; and operating the first image sensing element by the first exposure time and the second image sensing element by the second exposure time after the computing operation.

13 Claims, 18 Drawing Sheets

(56) References Cited

U.S. PATENT DOCUMENTS

| | | |
|---|---|---|
| 8,004,502 B2 | 8/2011 | Keam |
| 8,289,300 B2 | 10/2012 | Keam |
| 2005/0134698 A1 | 6/2005 | Schroeder et al. |
| 2005/0275747 A1* | 12/2005 | Nayar ............... H04N 5/2351 348/362 |
| 2006/0056689 A1 | 3/2006 | Wittebrood et al. |
| 2006/0139608 A1* | 6/2006 | Wiener ................ G02B 7/346 355/69 |
| 2009/0085881 A1 | 4/2009 | Keam |
| 2009/0091554 A1 | 4/2009 | Keam |
| 2010/0123873 A1 | 5/2010 | Raymond et al. |
| 2010/0177062 A1 | 7/2010 | Liu et al. |
| 2010/0225617 A1* | 9/2010 | Yoshimoto ............ G06F 3/042 345/175 |
| 2010/0283875 A1 | 11/2010 | Naskali et al. |
| 2011/0012866 A1 | 1/2011 | Keam |
| 2011/0193969 A1* | 8/2011 | Tsai ..................... G06F 3/0428 348/169 |
| 2012/0212639 A1 | 8/2012 | Gu et al. |
| 2013/0063402 A1 | 3/2013 | Su et al. |

FOREIGN PATENT DOCUMENTS

| | | |
|---|---|---|
| CN | 101808178 B | 6/2012 |
| TW | 1292120 | 1/2008 |
| TW | 200945139 | 11/2009 |
| WO | WO2009/089495 A1 | 7/2009 |

OTHER PUBLICATIONS

Office Action from Republic of China, Taiwan Patent Office in a corresponding Patent Application No. 100121547 dated Feb. 26, 2014, 4 pages in Chinese.

* cited by examiner

OPTICAL TOUCH SYSTEM AND IMAGE PROCESSING METHOD THEREOF

CROSS-REFERENCE TO RELATED APPLICATION

This application is a divisional of U.S. application Ser. No. 13/495,712, filed Jun. 13, 2012 which claims the priority of the Taiwanese Patent Application No. 100121547 filed Jun. 21, 2011.

BACKGROUND

1. Technical Field

The present invention relates to an optical touch system and an image processing method thereof.

2. Related Art

An optical touch system generally comprises an imaging device, an illuminating device, and a computing device for determining the touch position of an object. Typically, the object may be a finger, a stylus, or the like. The imaging device is configured to view a touch zone above a touch surface. The illuminating device is configured such that when an object is in the touch zone, the illuminating device can make the object generate an identifiable contrast image on a picture produced by the imaging device. The computing device is configured to calculate the coordinates of the object according to the brightness variation of the picture produced by the imaging device.

The optical touch system can be designed as a system in which the object entering into the touch zone blocks the light projected from the illuminating device so as to form a dark area on the imaging device, or as a system in which the object reflects the light projected from the illuminating device to form a bright area. Regardless of which system is employed, the current coordinate calculating method requires two pictures, a background picture and a picture taken when there is an object in the touch zone. Normally, the background picture is generated and stored before operation. The optical touch system can identify the region having obviously different intensity by comparing the captured picture and the background picture. When the region having obviously different intensity is used as an image formed by an object, the optical system can calculate the coordinates of the object according to some features of the region having obviously different intensity.

In addition to the region having obviously different intensity, the intensity levels of a portion of the background area of the picture may be changed due to the change of the light path or the manner of light reflection of the touch surface caused by the object such that a difference may occur between a background area of the picture and the corresponding portion of the background picture. Such difference may make it impossible for the region having obviously different intensity to be correctly calculated or properly identified. As a result, the coordinates of the object cannot be accurately calculated.

SUMMARY

One embodiment provides an image processing method and an optical touch system using the same. The image processing method can use a single picture to determine the coordinates of an object such that incorrect coordinates will not be obtained when there is a difference between a background area of a picture and the corresponding portion of a background picture.

In one embodiment, an image processing method for compensating image intensity variation is provided. The image processing method includes: obtaining a background picture including a first pixel and a second pixel, wherein the first pixel has a first intensity value in response to that a first sensing element is operated by a fixed exposure time, and the second pixel has a second intensity value in response to that a second image sensing element is operated by the fixed exposure time; extracting the first intensity value from the first pixel and the second intensity value from the second pixel; performing a computing operation including computing a first exposure time, according to comparison between the first intensity value and a target intensity value, for operating the first image sensing element, and a second exposure time, according to comparison between the second intensity value and the target intensity value, for operating the second image sensing element; and operating the first image sensing element by the first exposure time and the second image sensing element by the second exposure time after the computing operation.

In one embodiment, an image processing method for compensating image intensity variation is provided. The image processing method includes: obtaining a background picture including a first pixel group including a first pixel, and a second pixel group including a second pixel, wherein the first pixel has an intensity value in response to that a first sensing element is operated by a fixed exposure time, and the second pixel has an intensity value in response to that a second image sensing element is operated by the fixed exposure time; extracting a first intensity value representing the first pixel group and a second intensity value representing the second pixel group; calculating a first ratio of a target intensity value to the first intensity value, and a second ratio of the target intensity value to the second intensity value; determining a first adjustment value of the first pixel group based on the first ratio, and a second adjustment value of the second pixel group based on the second ratio; and obtaining a compensated intensity fluctuating pattern by multiplying the first adjustment value by the first intensity value and the second adjustment value by the second intensity value.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1:
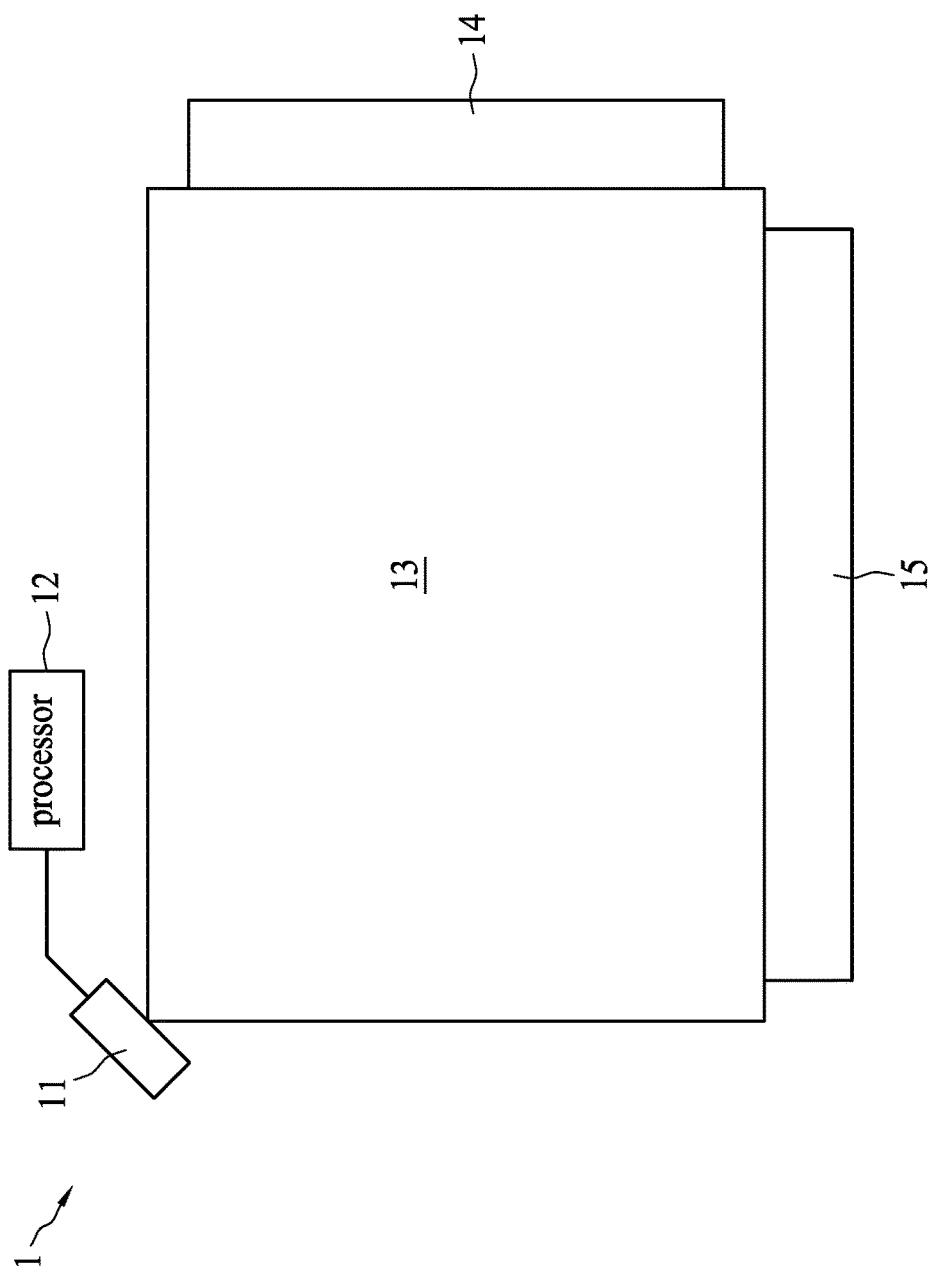
FIG. 1 is a schematic view showing an optical touch system according to one embodiment of the present invention.

FIG. 1 is a schematic view showing an optical touch system 1 according to one embodiment of the present invention. One embodiment of the present invention is related to an image processing method that can calculate the coordinate data using a single picture. The image processing method is applicable to the optical touch system 1 shown in FIG. 1. Referring to FIG. 1, the optical touch system 1 comprises an image sensor module 11 and a processor 12. The processor 12 is coupled with the image sensor module 11 to analyze an object image from the picture generated by the image sensor module 11. The image sensor module 11 is configured to monitor a touch area 13. The illuminating devices 14 and 15 are disposed adjacent to the touch area 13 to provide illumination such that the object on the touch area 13 can generate an identifiable image on a picture. The illuminating device 14 or 15 can be an active light source including, for example, a light tube, a plurality of light emitting diodes, or a combination of a light emitting diode and a light guide member. The illuminating device 14 or 15 may also be a passive light source such as a mirror.

The image processing method of one embodiment of the present invention can be applied using an illumination-compensated picture whose image intensity variation is compensated for and with a normally captured picture whose image intensity variation is not compensated for. The description below begins by describing application of the image processing method of one embodiment of the present invention to an illumination-compensated picture.

Figure 2:
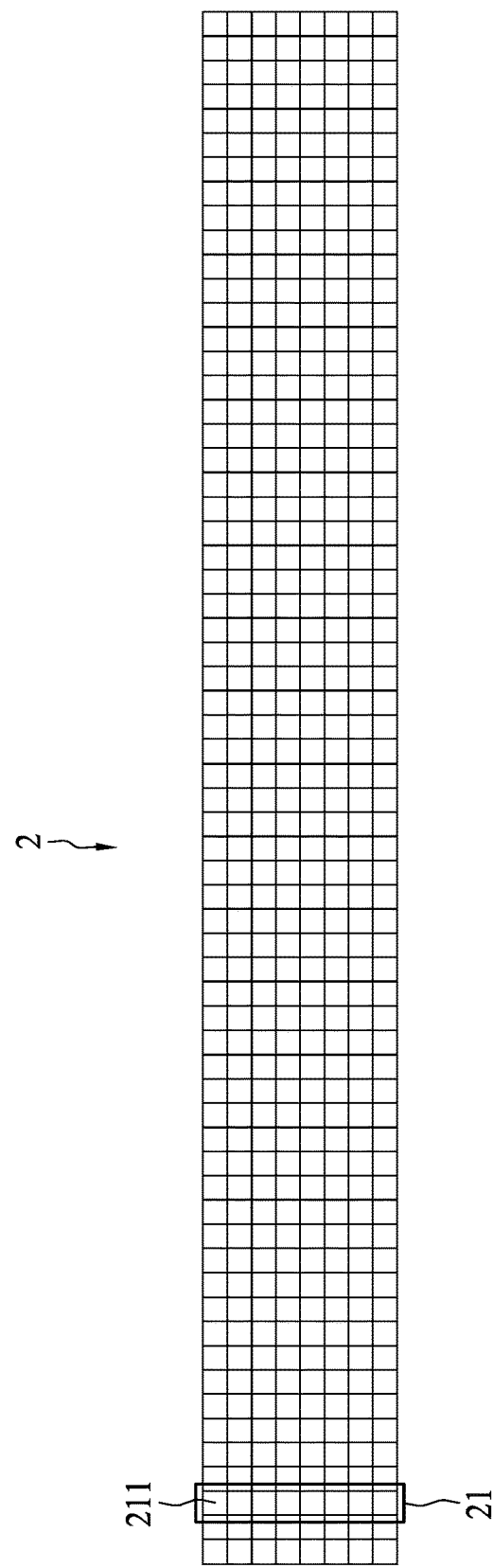
FIG. 2 is an illustration of a picture according to one embodiment of the present invention.

The method of compensating for image intensity variation can be implemented as software or hardware means and is applicable to a picture to increase the intensity of the portion that originally has lower intensity and to reduce the intensity of the portion that originally has higher intensity, so as to obtain a new picture with uniform intensity. For example, as shown in FIG. 2, the image sensor module 11 may produce a picture 2. The picture 2 may comprise a plurality of pixel groups 21 that may be arranged along a direction. Each pixel group 21 may comprise a plurality of pixels 211. In one embodiment, each pixel group 21 may be a pixel column, and the plurality of pixel groups 21 are arranged along a row direction. In another embodiment, the pixel group 21 may be a pixel row, and the plurality of pixel groups 21 are arranged along a column direction. The processor 12 is configured to extract an intensity value representing each pixel group 21 from the captured picture 2. In one embodiment, the intensity value representing a pixel group 21 can be a sum of the intensity values of the pixels 211 of the pixel group 21. In another embodiment, the intensity value representing a pixel group 21 can be an average of the intensity values of the pixels 211 of the pixel group 21. After the calculation of the intensity values of all pixel groups 21 is completed, an intensity fluctuating pattern 3 as shown in FIG. 3 can be obtained.

Figure 3:
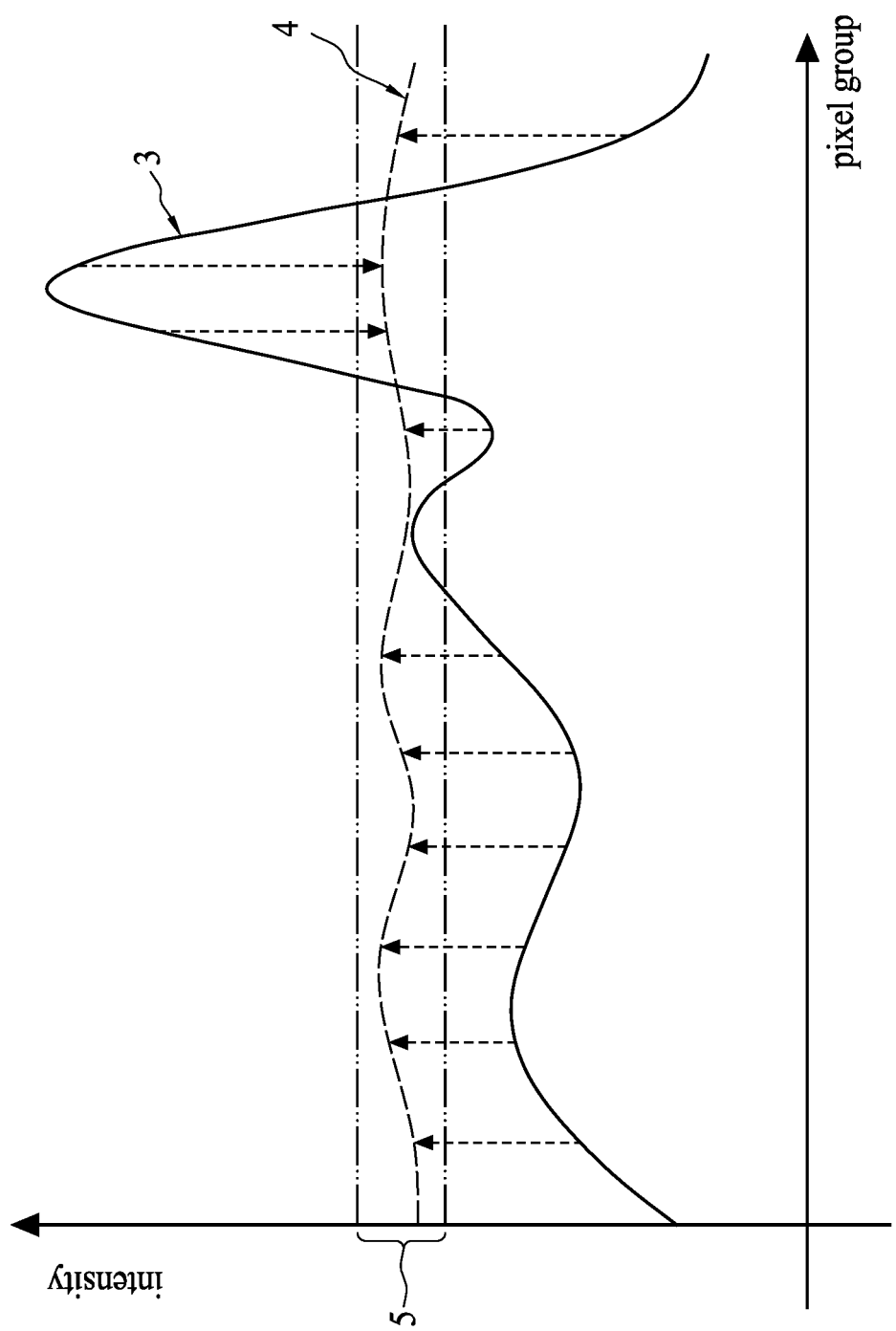
FIG. 3 schematically depicts an intensity fluctuating pattern according to one embodiment of the present invention.

As illustrated in FIG. 3, the intensity fluctuating pattern 3 exhibits significant variation. The intensity fluctuating pattern 3 may be compensated for in advance. In one embodiment, an adjustment value for each pixel group 21 is determined. Next, each adjustment value is multiplied by the intensity value of the corresponding pixel group 21 to obtain a new intensity fluctuating pattern 4 exhibiting less variation. In one embodiment, the adjusted intensity fluctuating pattern 4 can vary within an intensity range 5.

The adjustment value is used to compensate for the variation of an intensity fluctuating pattern. The adjustment value can be determined through many methods, one of which is illustratively demonstrated herein. In one embodiment, an adjustment value can be obtained by the following steps: A background picture is generated using a fixed exposure time. Next, an intensity value ($I_p$) of each pixel group is determined. Finally, a ratio of a target intensity value ($I_T$) to the intensity value ($I_p$) for each pixel group is calculated, wherein the ratio ($I_p/I_T$) can be used as an adjustment value.

Figure 4:
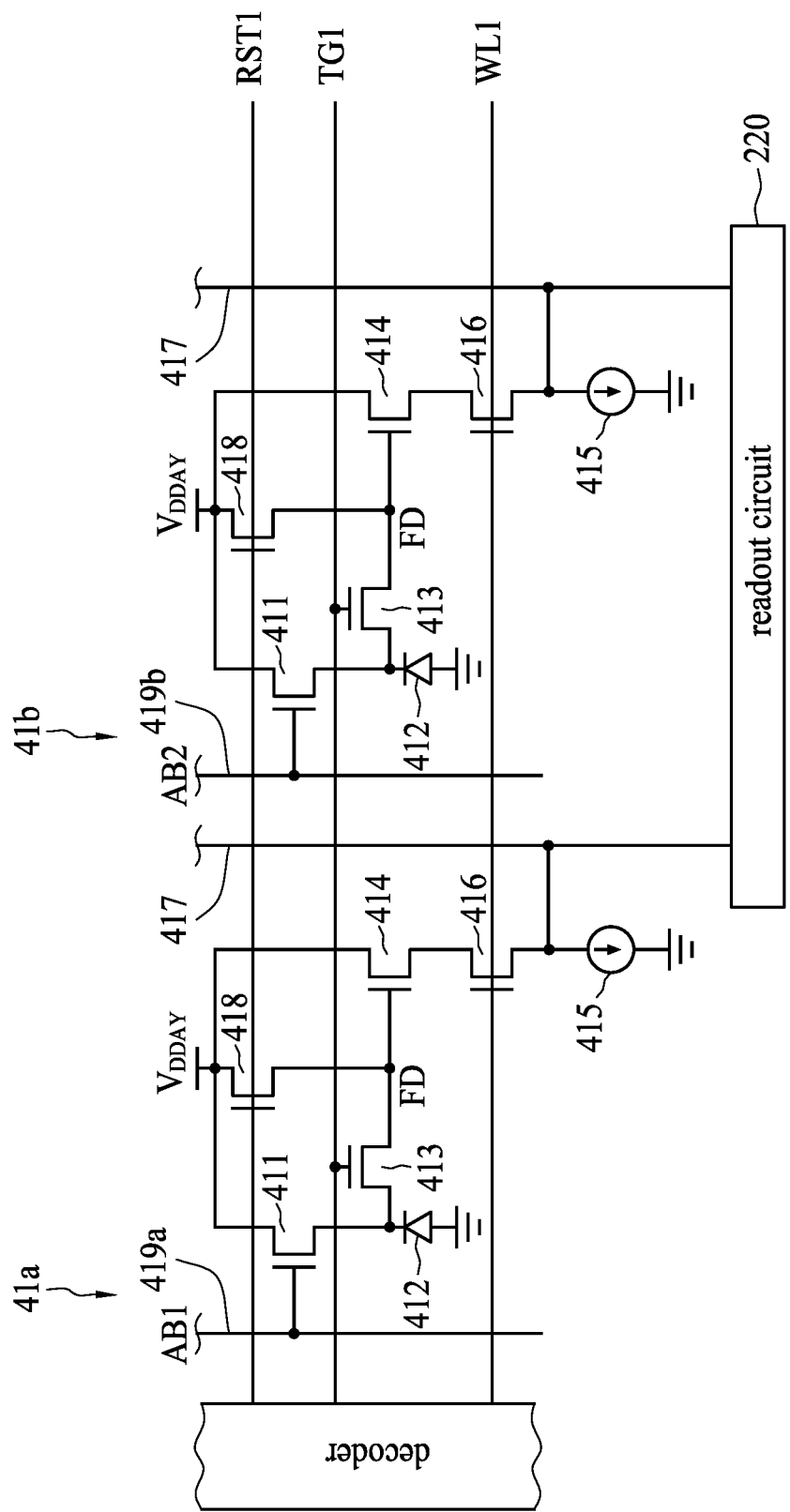
FIG. 4 schematically depicts a portion of sensing elements and the circuit of an image sensor module according to one embodiment of the present invention.

The compensation for the intensity variation of the picture can be achieved through hardware. As illustrated in FIG. 4, the image sensor module 11 comprises a plurality of image sensing elements 41a and 41b each comprising an electronic shutter 411 and a photo detector 412. The electronic shutter 411 is coupled with the photo detector 412 to control the exposure time of the photo detector 412. The photo detector 412 generates charge in response to received light. The transistor 413 controls the transferring of the charge from the photo detector 412 to a floating diffusion (FD) output node. The transistor 414 and the constant current source 415 form as a source follower, which can amplify the photovoltaic voltage produced by the photo detector 412. The transistor 416 can be activated when the signal WL1 is at a high level, and at this moment, data can be output to the bit line 417 that is coupled to a readout circuit 220. When signals RST1 and TG1 go high, the transistors 418 and 413 are activated such that the voltage supply VDDAY can reset the photo detector 412 to a photo-electric conversion initiation state. When the transistor 413 is turned on, the charge flows from the photo-detector 412 to the FD output node. When the signal RST1 goes high, the voltage source VDDAY resets the FD output node.

Referring to FIG. 4, the electronic shutters 411 of the image sensing elements 41a and 41b are respectively coupled to different shutter control lines 419a and 419b. As such, different signals AB1 and AB2 can be applied to the electronic shutters 411 of the image sensing elements 41a and 41b to operate the image sensing elements 41a and 41b for different exposure times such that the intensity values of the corresponding pixels of a picture can be independently manipulated. During operation, the image sensing element 41a or 41b, which is exposed to stronger light intensity, is assigned shorter exposure time and the image sensing element 41a or 41b which is exposed to weaker light intensity is assigned longer exposure time. As a result, a captured picture can exhibit a more uniform background intensity level.

The exposure time for controlling the electronic shutter 411 of each image sensing element 41a or 41b can be obtained using the following method; however, the present invention is not limited to such method. The method obtains a background picture by a fixed exposure time. Next, the intensity value of each pixel of the background picture is extracted. Thereafter, the exposure time that is needed for operating the corresponding electronic shutter 411 of an image sensing element 41a or 41b and can make the corresponding pixel achieve a target intensity level is computed using the target intensity level and the intensity value of the pixel.

Figure 5:
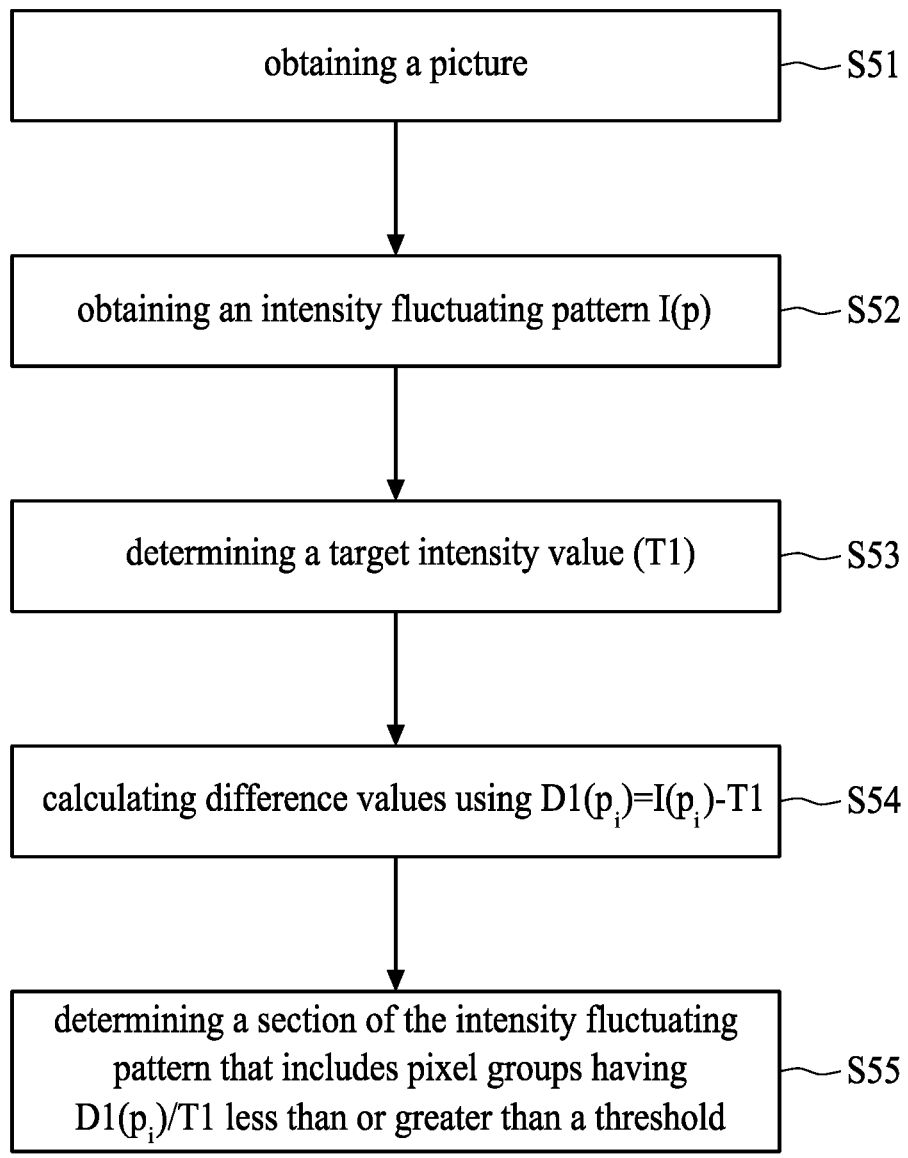
FIG. 5 is a flow chart related to an image processing method according to one embodiment of the present invention.
Figure 6:
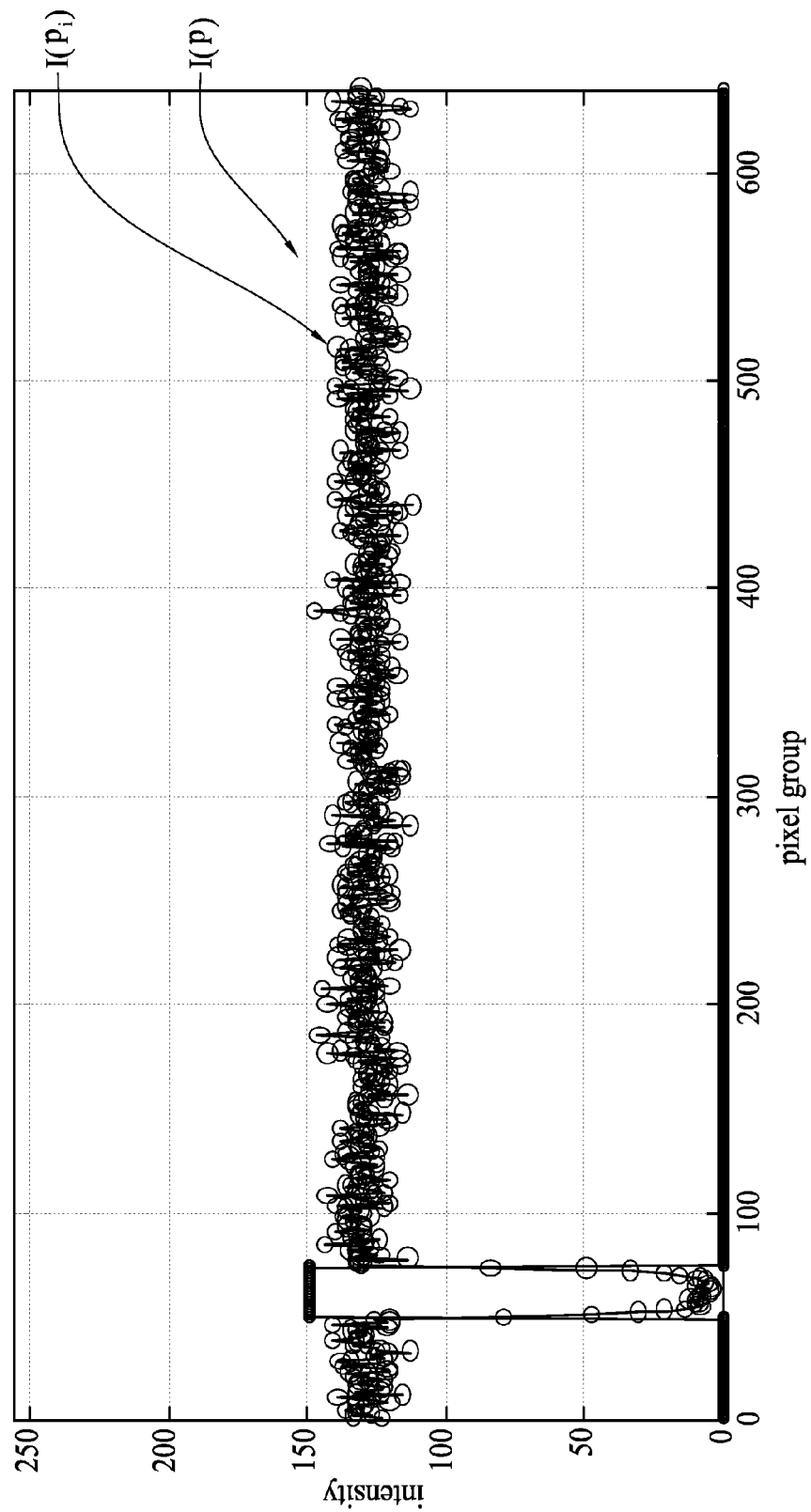
FIG. 6 schematically depicts an intensity fluctuating pattern according to another embodiment of the present invention.
Figure 7:
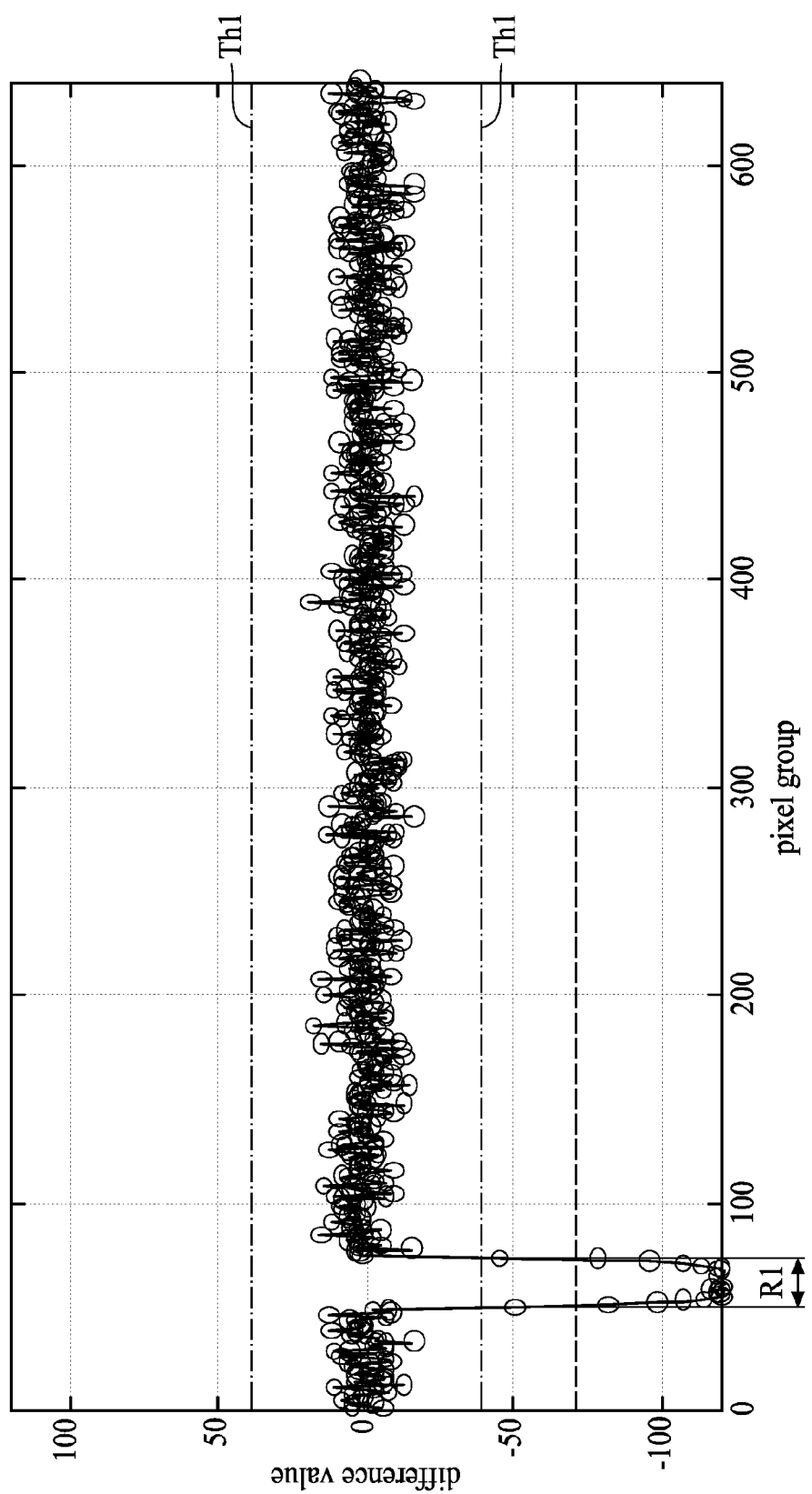
FIG. 7 schematically depicts a difference fluctuating pattern according to one embodiment of the present invention.

FIG. 5 is a flow chart related to an image processing method according to one embodiment of the present invention. Referring to FIG. 5, at Step S51, a picture is captured, wherein the picture comprises a plurality of pixel groups that can be arranged along a direction. At Step S52, the intensity value $I(p_i)$ of each pixel group of the picture is computed to obtain an intensity fluctuating pattern I(p) as shown in FIG. 6, where $p_i$ represents the i-th pixel group. The intensity value of each pixel group can be the sum of the intensities of pixels or the average of the intensities of pixels of the pixel group. At Step S53, a target intensity value (T1) is decided. In one embodiment, the target intensity value (T1) can be the average of the intensity fluctuating pattern I(p) or the intensity values $I(p_i)$. In another embodiment, the target intensity value (T1) can be a predetermined value. At Step S54, a difference fluctuating pattern D1(p) formed by a plurality of difference values $D1(p_i)$ each calculated, as shown in equation (1), by subtracting the target intensity value (T1) from the corresponding intensity value $I(p_i)$ on the intensity fluctuating pattern I(p) as shown in FIG. 7 is obtained.

$$D1(p_i)=I(p_i)-T1 \qquad (1)$$

At Step S55, a threshold Th1 is used to determine a section R1 of the intensity fluctuating pattern I(p) that includes pixel groups having ratios of difference values $D1(p_i)$ to the target intensity value T1 less than or greater than the threshold Th1 as an object image.

Figure 8:
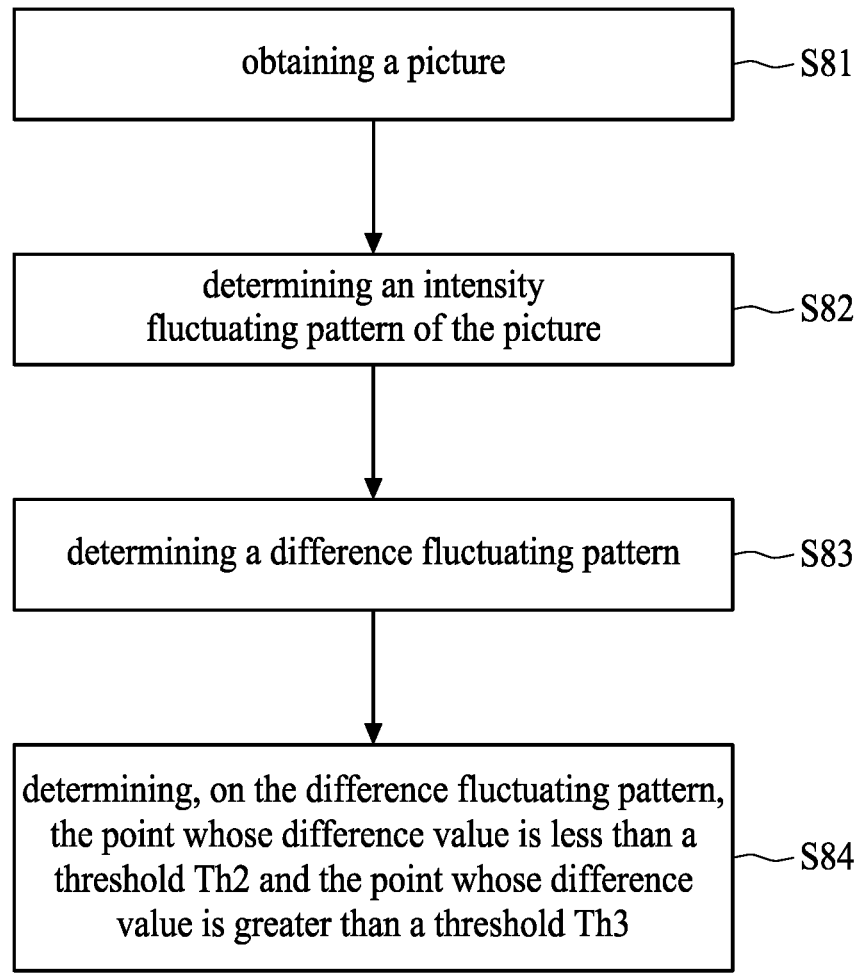
FIG. 8 is a flow chart related to an image processing method according to another embodiment of the present invention.
Figure 9:
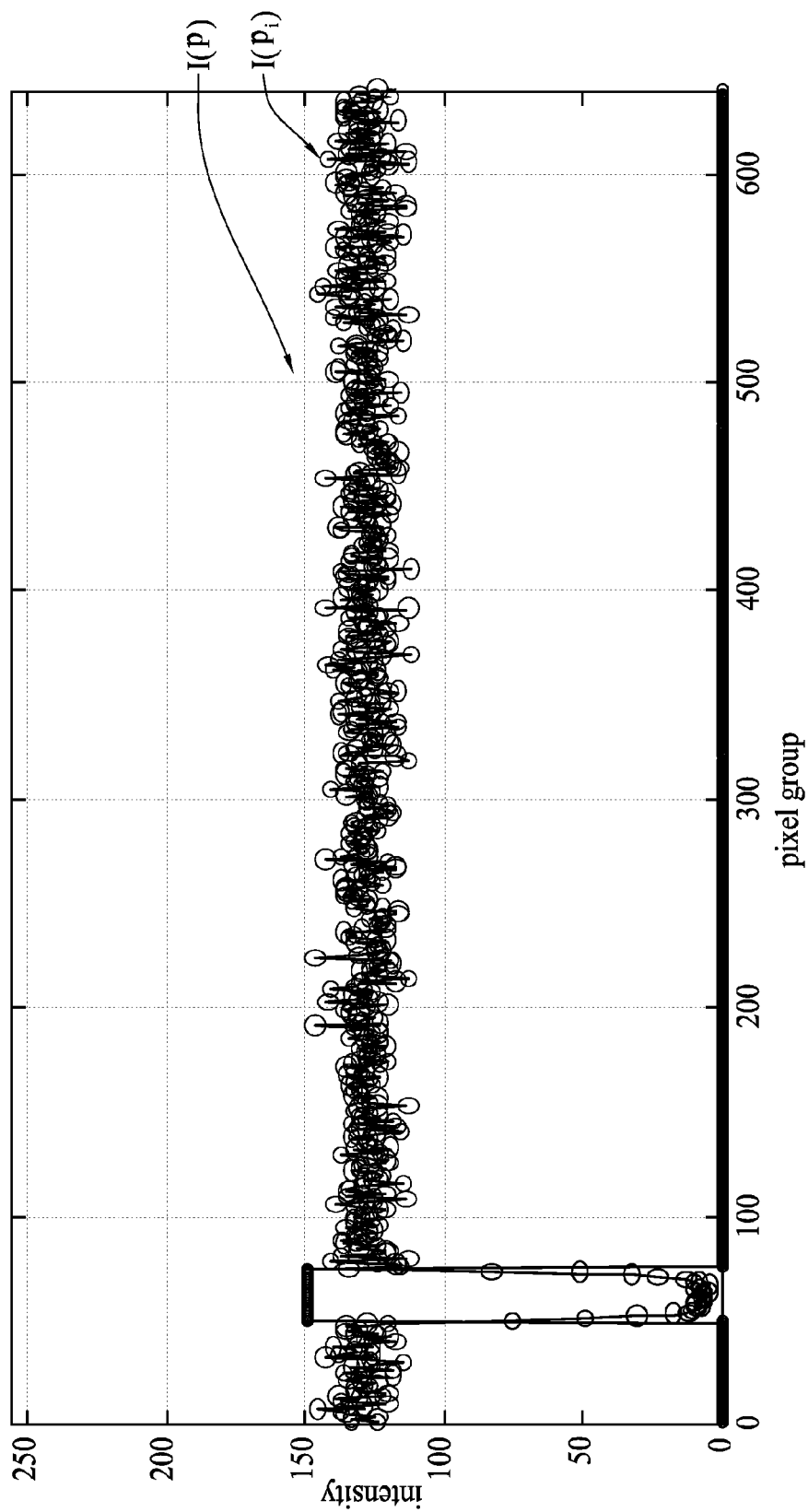
FIG. 9 schematically depicts an intensity fluctuating pattern according to another embodiment of the present invention.
Figure 10:
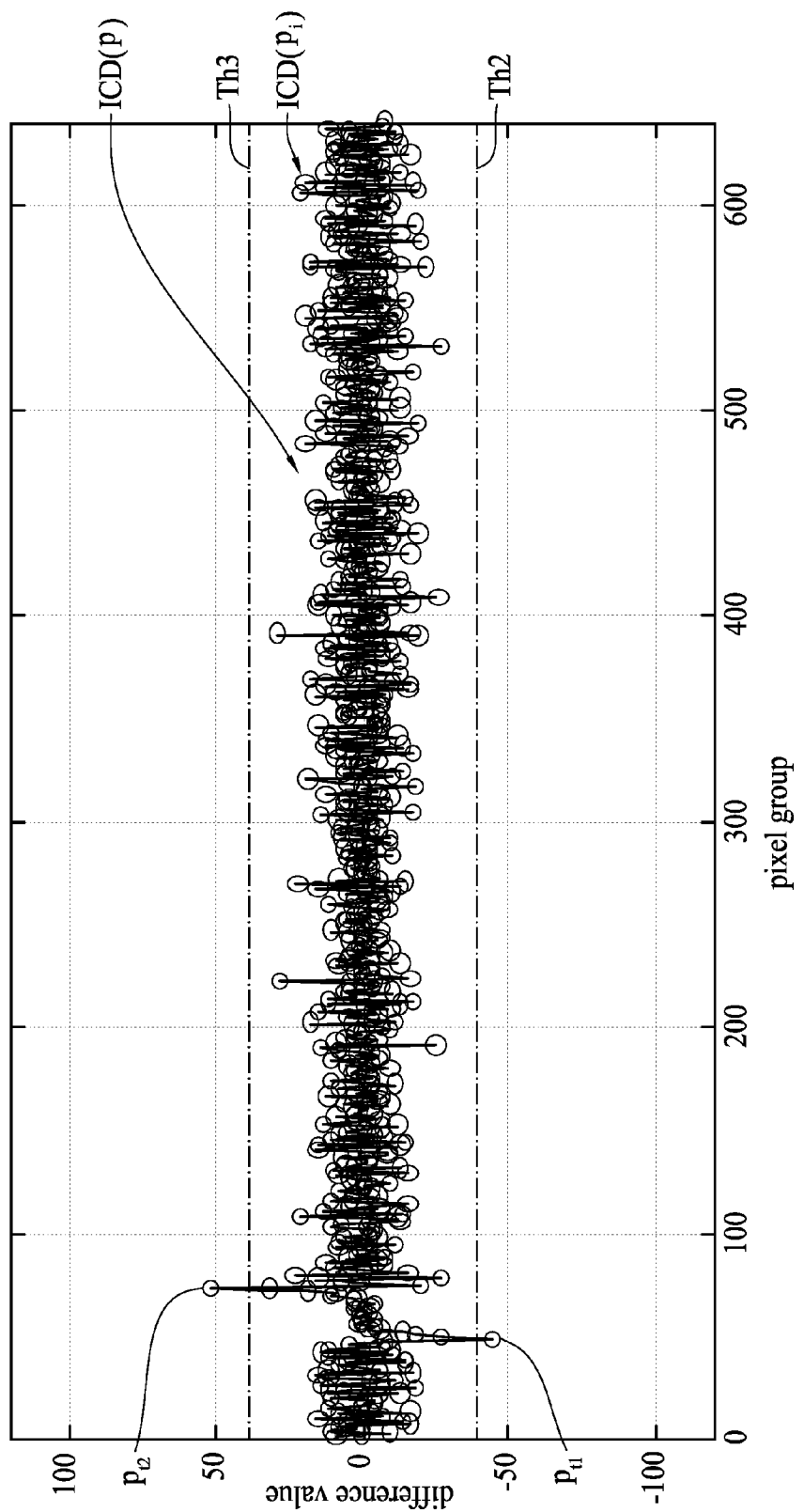
FIG. 10 schematically depicts a difference fluctuating pattern according to another embodiment of the present invention.

FIG. 8 is a flow chart related to an image processing method according to another embodiment of the present invention. Referring to FIG. 8, as Step S81, a picture is obtained. The picture comprises a plurality of pixel groups that may be arranged along a direction. At Step S82, the intensity value $I(p_i)$ representing each pixel group $(p_i)$ of the picture is extracted to obtain an intensity fluctuating pattern I(p) as shown in FIG. 9, where $p_i$ represents the i-th pixel group. The intensity value representing each pixel group can be either the sum of the intensity values of pixels of the pixel group or an average of the intensity values of pixels of the pixel group. At Step S83, a difference fluctuating pattern ICD(p) as shown in FIG. 10 is determined. The difference fluctuating pattern ICD(p) has a plurality of difference values $ICD(p_i)$ sequentially calculated along the arrangement direction of the pixel groups and each $ICD(p_i)$ determined by subtracting the intensity values of two different pixel groups ($p_i$ and $p_{i+1}$). At Step S84, on the difference fluctuating pattern ICD(p), the point $P_{t1}$ whose difference value is less than a threshold Th2 and the point $P_{t2}$ whose difference value is greater than a threshold Th3 are determined. One of the pixel groups corresponding to the point $P_{t1}$ is used as a left boundary pixel group, and one of the pixel groups corresponding to the point $P_{t2}$ is used as a right boundary pixel group. Accordingly, the section of the intensity fluctuating pattern constituted by a set of successive pixel groups between the left and right boundary pixel groups is obtained, and the section can then be selected as an object image.

Figure 11:
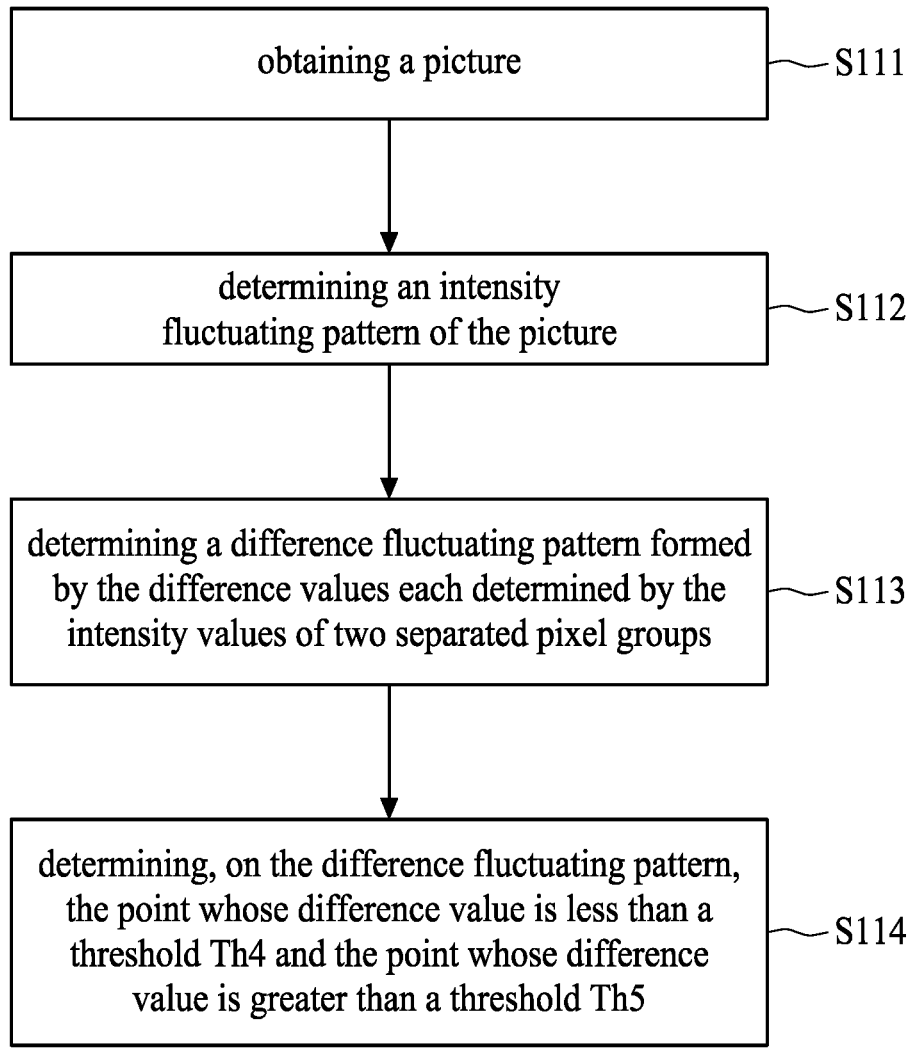
FIG. 11 is a flow chart related to an image processing method according to another embodiment of the present invention.
Figure 12:
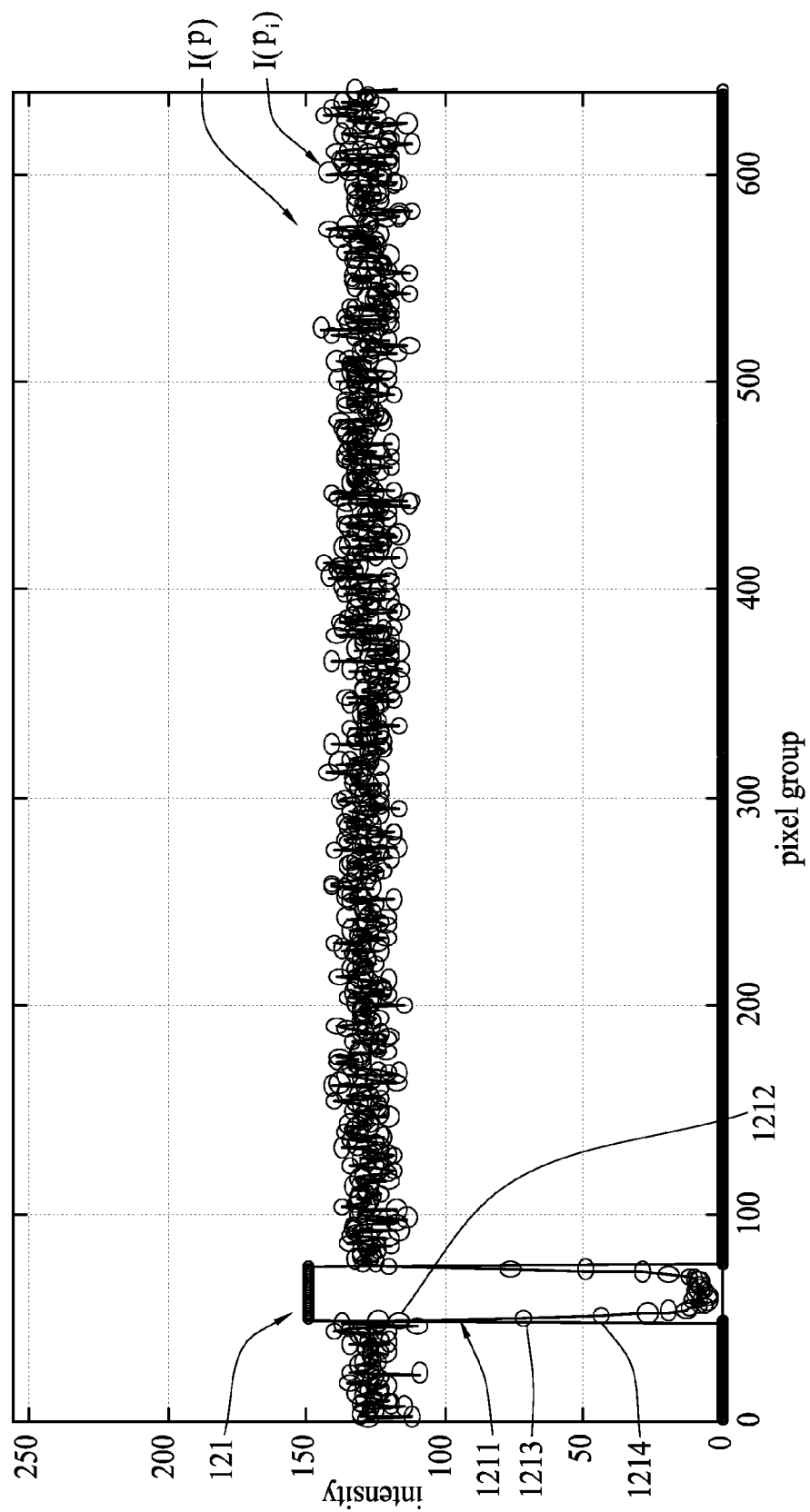
FIG. 12 schematically depicts an intensity fluctuating pattern according to another embodiment of the present invention.
Figure 13:
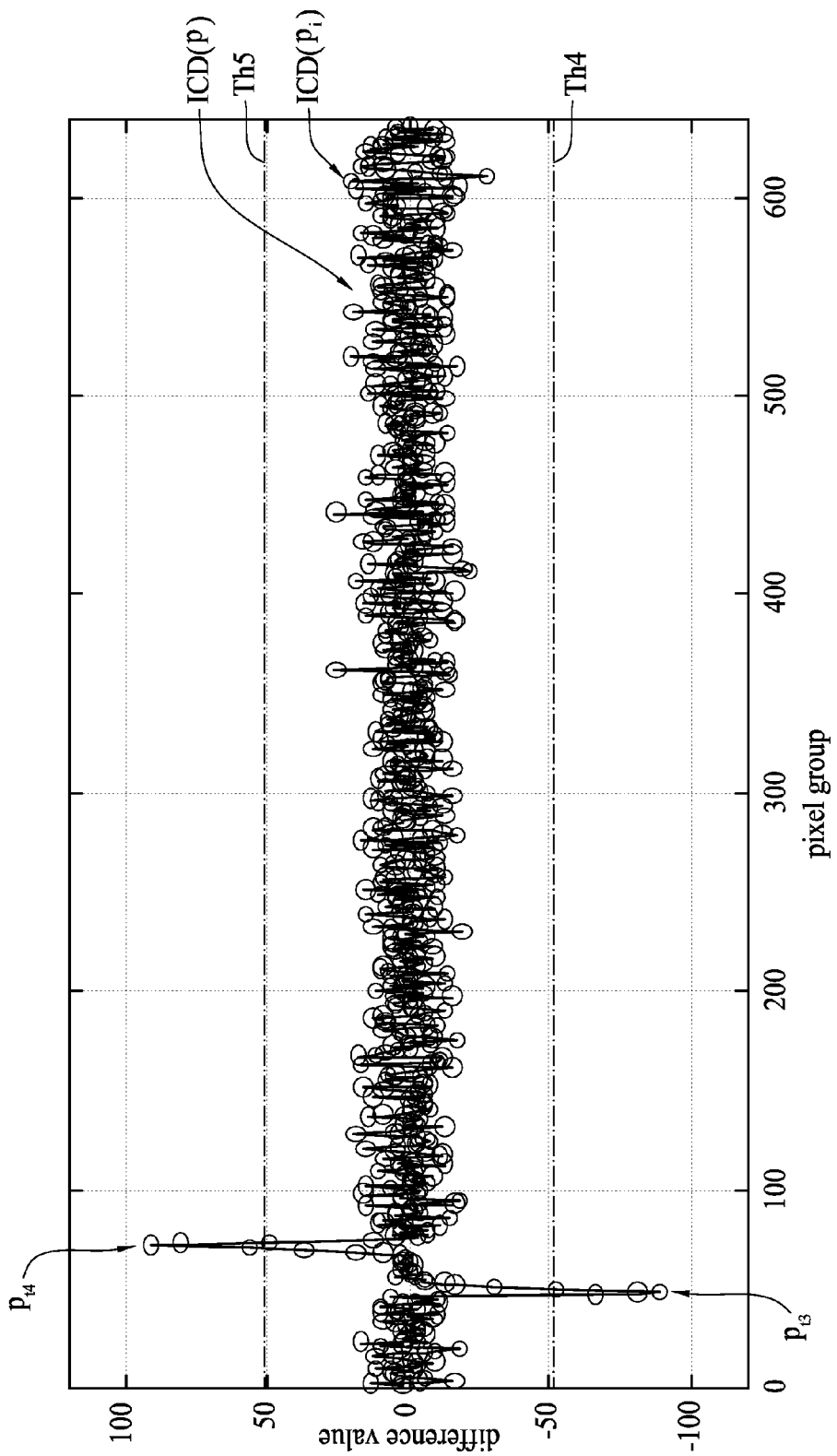
FIG. 13 schematically depicts a difference fluctuating pattern according to another embodiment of the present invention.

FIG. 11 is a flow chart related to an image processing method according to another embodiment of the present invention. Referring to FIG. 11, at Step S111, a picture comprising a plurality of pixel groups arranged along a direction is generated. At Step S112, the intensity value $I(p_i)$ representing each pixel group $(p_i)$ of the picture is extracted to obtain an intensity fluctuating pattern I(p) as shown in FIG. 12, where $p_i$ represents the i-th pixel group. The intensity value representing each pixel group can be either the sum of the intensity values of pixels of the pixel group or the average of the intensity values of pixels of the pixel group. At Step S113, sequential calculation of the difference value $ICD(p_i)$ between a pixel group $p_i$ and a pixel group $p_{i+q+1}$ that are spaced at an interval of a predetermined number q is performed one after another along the arrangement of the pixel group $p_i$, to the pixel groups of the picture to obtain a difference fluctuating pattern ICD(p) as shown in FIG. 13. At Step S114, on the fluctuating pattern ICD(p), the point $P_{t3}$ whose difference value is less than a threshold Th4 and the point $P_{t4}$ whose difference value is greater than a threshold Th5 are determined. One of the pixel groups corresponding to the point $P_{t3}$ is used as a left boundary pixel group, and one of the pixel groups corresponding to the point $P_{t4}$ is used as a right boundary pixel group. Accordingly, the section constituted by a set of successive pixel groups between the left and right boundary pixel group is obtained, and the section can be selected as an object image 121 as shown in FIG. 12.

In particular, compared with the method of calculating the difference value of two adjacent pixel groups ($p_i$ and $p_{i+1}$), the method of calculating the difference value between a pixel group $p_i$ and a pixel group $p_{i+q+1}$ that are spaced at a predetermined number q can obtain larger difference values at the edges of the object image 121. As shown in FIG. 12, the difference value between two adjacent points 1212 and 1213 on the left side edge 1211 of the object image 121 is about 50, while the difference value between two separated points 1212 and 1213 is about 90. Moreover, due to the existence of noise, the method of calculating the difference value between a pixel group $p_i$ and a pixel group $p_{i+q+1}$ that are spaced at a predetermined number q is not easily affected by noise.

The predetermined number q can be a user set number, or a value determined by the modulation transfer function (MTF) of the image sensor module 11, wherein the MTF is a measure of the transfer of modulation (or contrast) from an object to an image. An MTF value can be a point on a MTF curve or an average of points on an MTF curve. From a background picture, a pixel group is selected and an initial intensity value $M_0$ representing the pixel group is extracted. The following equation (2), an MTF value, and the initial intensity value $M_0$ are used to determine the number of iterations needed when a last iterated result is less than a predetermined value, wherein the number of iterations can be used as the number q.

$$M_{i+1} = \frac{1-MTF}{1+MTF} M_i \quad (2)$$

The description below is related to an image processing method that is applicable to a normally captured picture whose image intensity variation is not compensated for.

Figure 14:
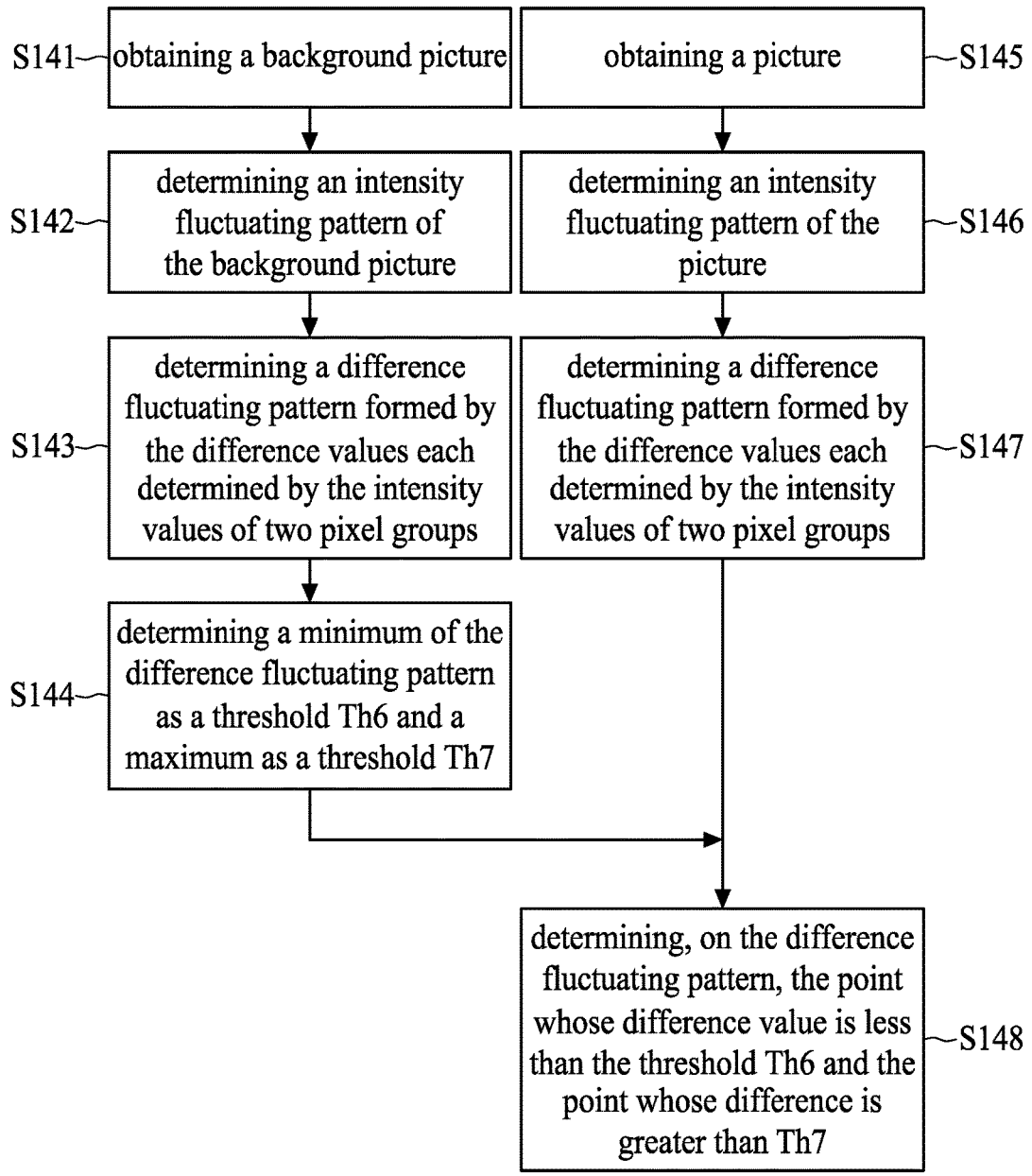
FIG. 14 is a flow chart related to an image processing method according to another embodiment of the present invention.
Figure 15:
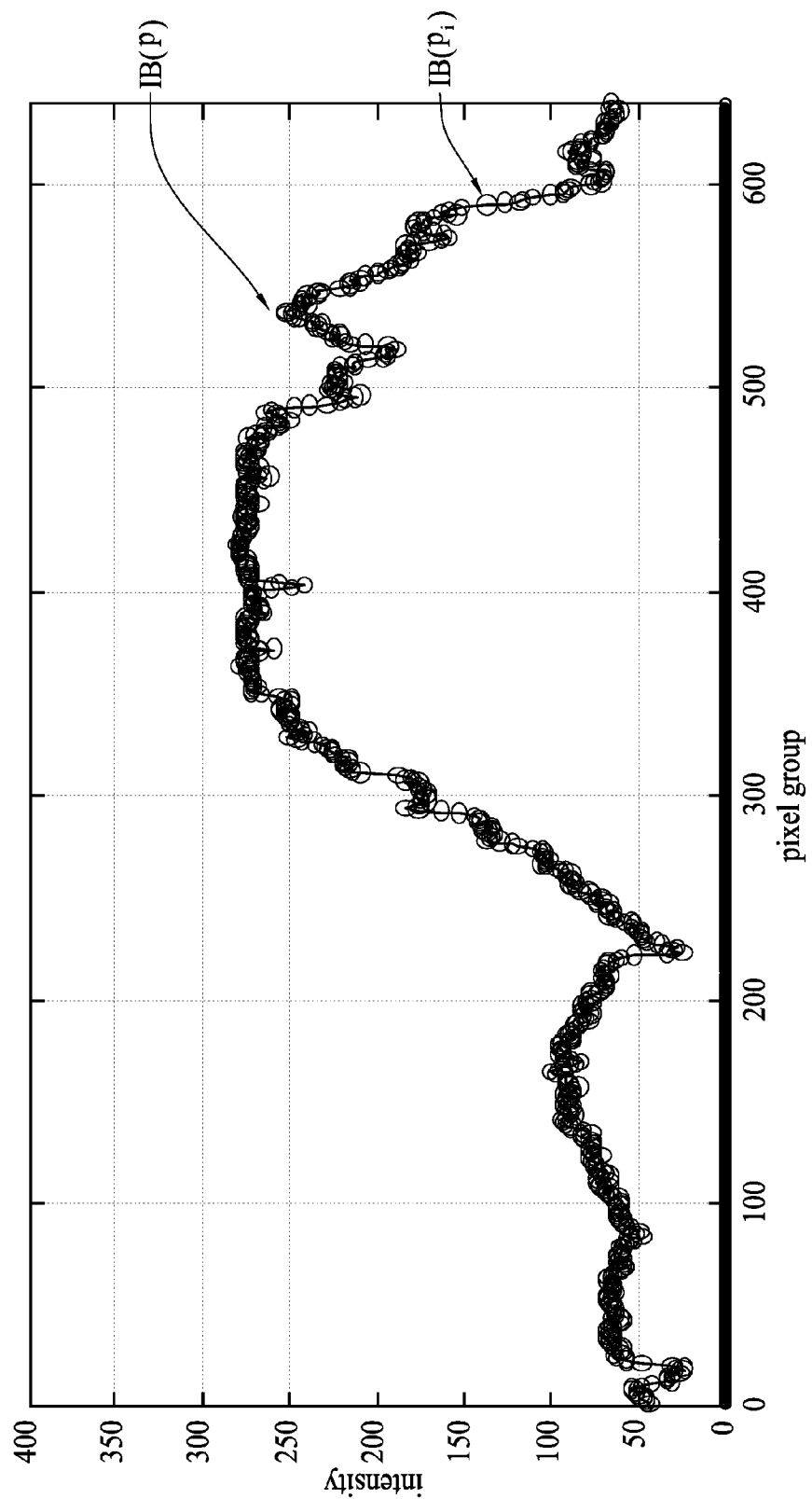
FIG. 15 schematically depicts an intensity fluctuating pattern according to another embodiment of the present invention.
Figure 16:
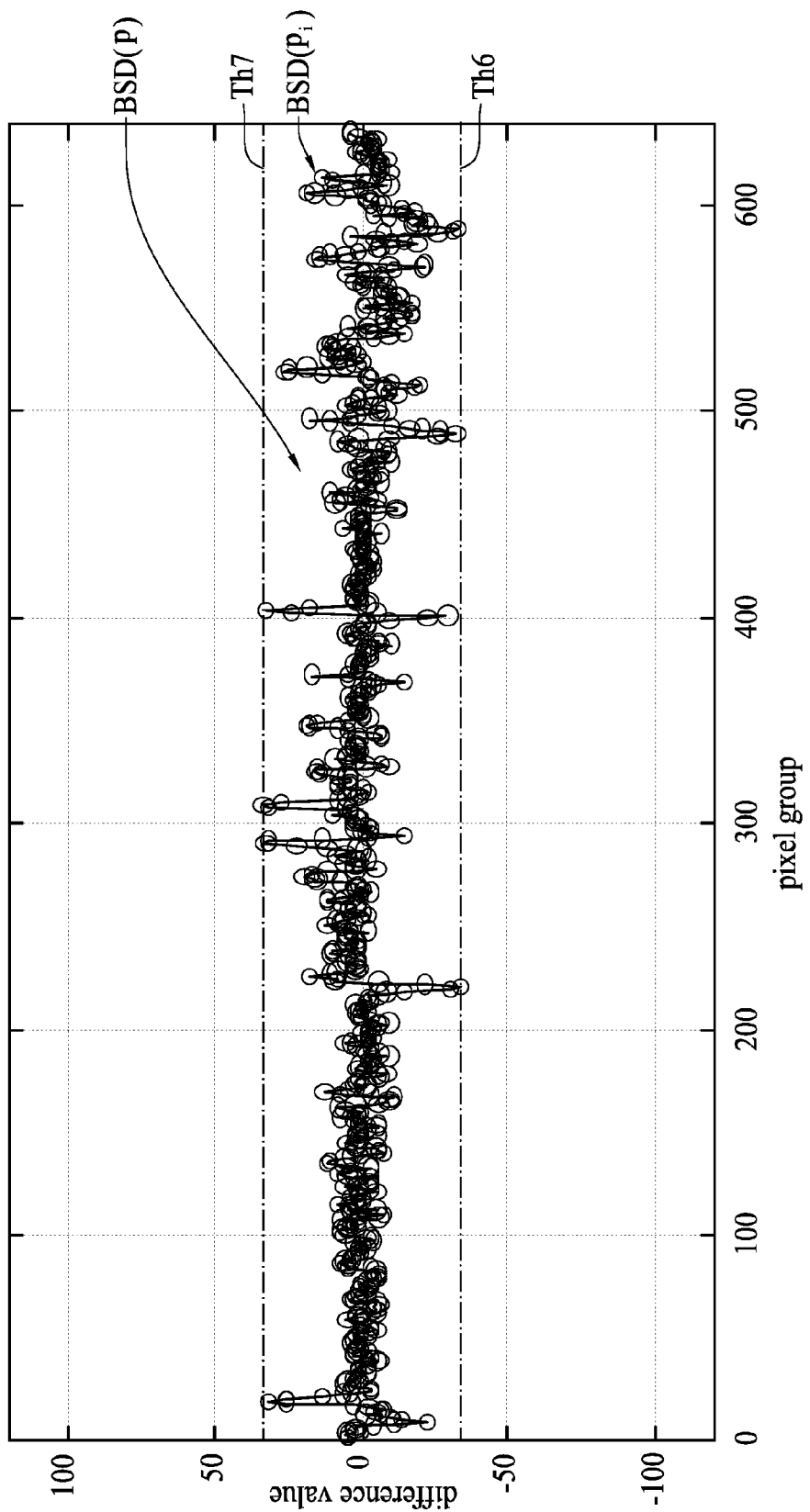
FIG. 16 schematically depicts a difference fluctuating pattern according to another embodiment of the present invention.

FIG. 14 is a flow chart related to an image processing method according to another embodiment of the present invention. Referring to FIG. 14, at Step 141, a background picture comprising a plurality of pixel groups arranged along a direction is generated. At Step S142, intensity values IB($p_i$) of the pixel groups of the background picture are extracted to obtain an intensity fluctuating pattern IB(p) as shown in FIG. 15, where $p_i$ represents the i-th pixel group. The intensity value IB($p_i$) of the pixel group can be the sum or the average of the intensity values of the pixels of the pixel group. At Step S143, the sequential calculation of the difference value BSD($p_i$) between a pixel group $p_i$ and a pixel group $p_{i+q+1}$ that are spaced at an interval of a predetermined number q is performed one after another along the arrangement of the pixel group $p_i$, to the pixel groups of the background picture to obtain a difference fluctuating pattern BSD(p) as shown in FIG. 16. In another embodiment, the sequential calculation of the difference value between two adjacent pixel groups ($p_i$ and $p_{i+1}$) is performed one after another along the arrangement of the pixel group $p_i$, to the pixel groups of the background picture to obtain a difference fluctuating pattern BSD(p).

Figure 17:
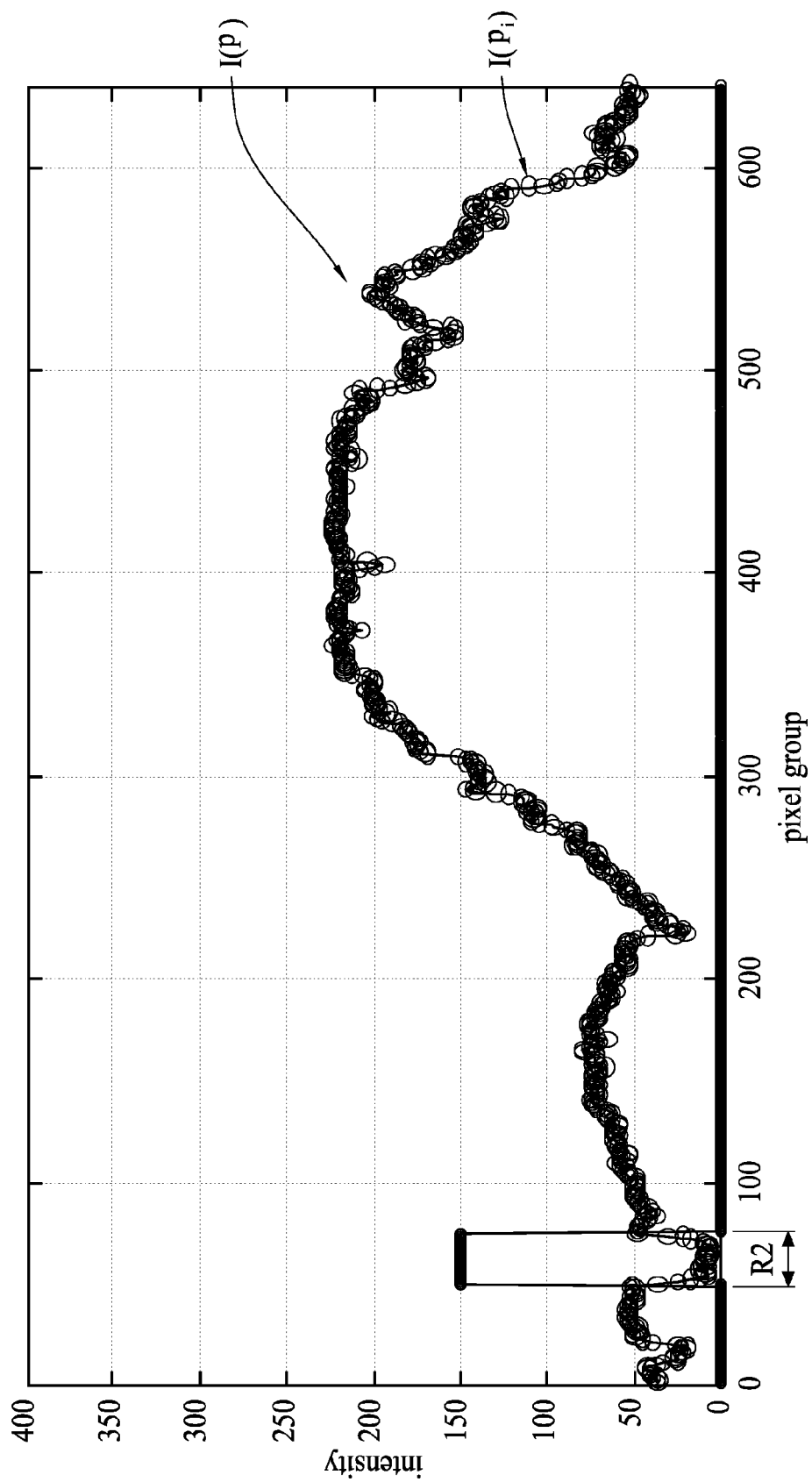
FIG. 17 schematically depicts an intensity fluctuating pattern according to another embodiment of the present invention.
Figure 18:
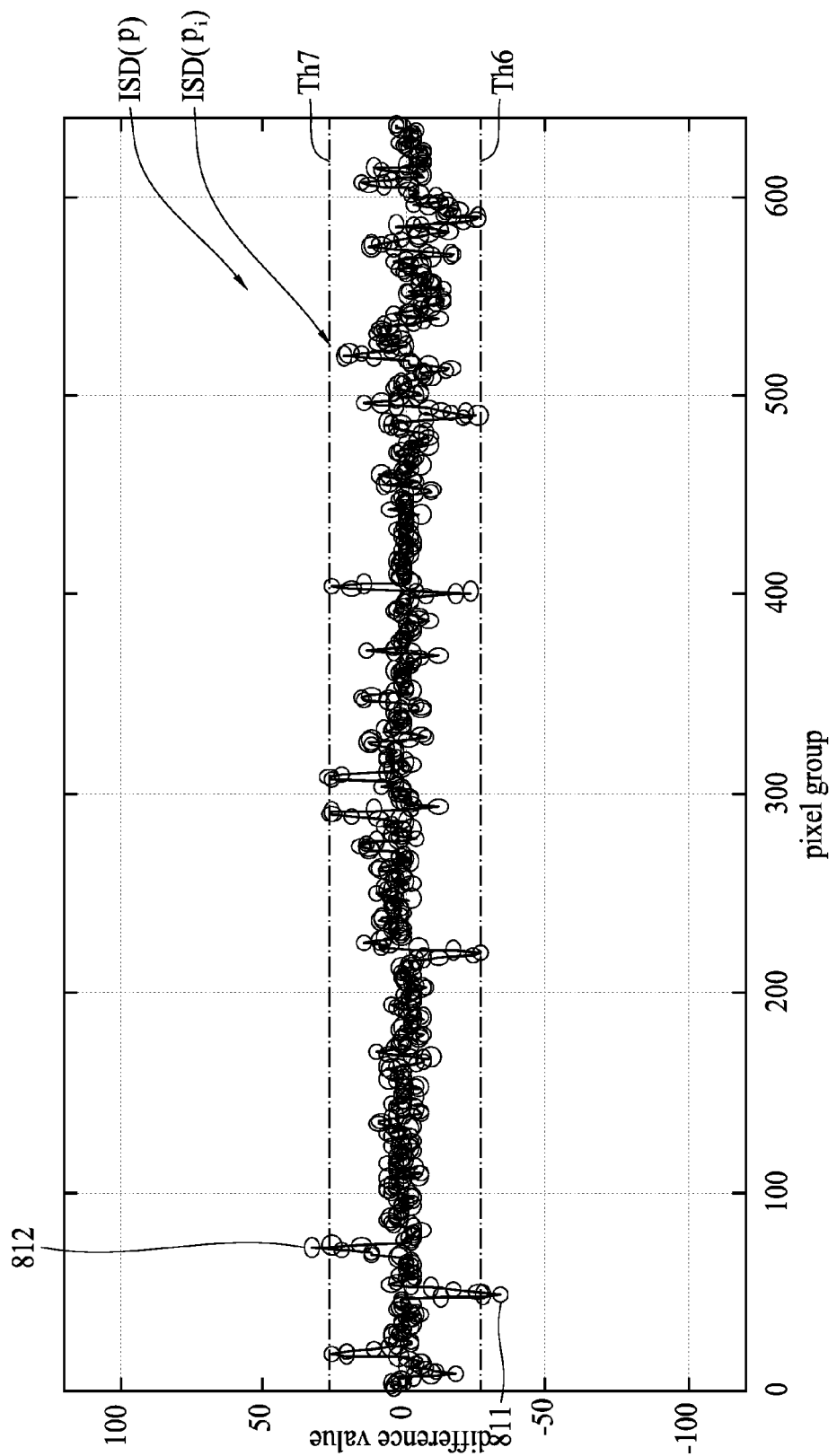
FIG. 18 schematically depicts a difference fluctuating pattern according to another embodiment of the present invention.

At Step S144, a minimum of the difference fluctuating pattern BSD(p) is then determined as a threshold Th6, and a maximum of the difference fluctuating pattern BSD(p) is determined as a threshold Th7. A Step S145, a picture comprises a plurality of pixel groups arranged along a direction obtained. At Step S146, an intensity value I($p_i$) representing each pixel group of the picture is extracted to obtain an intensity fluctuating pattern I(p) as shown in FIG. 17, where $p_i$ represents the i-th pixel group. The intensity value I($p_i$) of the pixel group can be the sum or the average of the intensity values of the pixels of the pixel group. At Step S147, the sequential calculation of the difference value ISD($p_i$) between a pixel group $p_i$ and a pixel group $p_{i+q+1}$ that are spaced at an interval of a predetermined number q is performed one after another along the arrangement of the pixel group $p_i$, to the pixel groups of the picture to obtain a difference fluctuating pattern ISD(p) as shown in FIG. 18. In another embodiment, the sequential calculation of the difference value between two adjacent pixel groups ($p_i$ and $p_{i+1}$) is performed one after another along the arrangement of the pixel group $p_i$, to the pixel groups of the picture to obtain a difference fluctuating pattern ISD(p). At Step S418, on the difference fluctuating pattern ISD(p), the point 811 whose difference value is less than the threshold Th6 and the point 812 whose difference value is greater than a threshold Th7 are determined. One of the pixel groups corresponding to the point 811 is used as a left boundary pixel group, and one of the pixel groups corresponding to the point 812 is used as a right boundary pixel group. Accordingly, the section R2 constituted by a set of successive pixel groups between the left and right boundary pixel groups can be obtained. The section R2 can then be selected as an object image.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications and variations can be made to the disclosed embodiments. It is intended that the specification and examples be considered as exemplary only, with the true scope of the disclosure being indicated by the following claims and their equivalent.

What is claimed is:

1. An image processing method for compensating image intensity variation, comprising:

obtaining a background picture including a first pixel group including a first pixel and a second pixel group including a second pixel, wherein the first pixel has an intensity value in response to a first sensing element operated by a fixed exposure time, and the second pixel has an intensity value in response to a second image sensing element operated by the fixed exposure time;

extracting a first intensity value representing pixels of the first pixel group and a second intensity value representing pixels of the second pixel group, wherein the pixels in the first pixel group are in a same column or row, and wherein the pixels in the second pixel group are in a same column or row;

performing a computing operation including computing a first exposure time, according to comparison between the first intensity value and a target intensity value, for operating the first image sensing element, and a second exposure time, according to comparison between the second intensity value and the target intensity value, for operating the second image sensing element; and operating the first image sensing element by the first exposure time and the second image sensing element by the second exposure time after the computing operation.

2. The image processing method of claim 1, further comprising capturing a picture when operating the first image sensing element by the first exposure time and the second image sensing element by the second exposure time.

3. The image processing method of claim 2, wherein the picture is an illumination-compensated picture.

4. The image processing method of claim 2, wherein the picture includes a first pixel group that includes a plurality of pixels, wherein a third intensity value representing an intensity value of the first pixel group of the picture is a sum or an average of intensity values of the pixels of the first pixel group of the picture.

5. The image processing method of claim 2, wherein the first pixel group is a line of pixels.

6. The image processing method of claim 2, wherein ratios of the second plurality of difference values to the threshold value is greater or smaller than a second threshold value.

7. The image processing method of claim 2, wherein the picture further includes a first pixel group that includes a plurality of pixels and a second pixel group that includes a plurality of pixels, wherein a third intensity value represents an intensity value of the first pixel group of the picture, and a fourth intensity value represents an intensity value of the second pixel group of the picture, the image processing method further comprising:

subtracting a threshold value from the third intensity value to obtain a first plurality of difference values, and from the fourth intensity value to obtain a second plurality of difference values, and to select the second pixel group of the picture according to ratios of the first plurality of difference values to the threshold value and ratios of the second plurality of difference values to the threshold value from the first pixel group of the picture and the second pixel group of the picture.

8. The image processing method of claim 7, wherein the threshold value is an average of the first intensity value and the second intensity value, or a predetermined value.

9. The image processing method of claim 7, wherein intensity values of the pixels of the first pixel group are within an intensity range.

10. An image processing method for compensating image intensity variation, comprising:

obtaining a background picture including a first pixel group including a first pixel, and a second pixel group including a second pixel, wherein the first pixel has an intensity value in response to that a first sensing element is operated by a fixed exposure time, and the second pixel has an intensity value in response to that a second image sensing element is operated by the fixed exposure time;

extracting a first intensity value representing the first pixel group and a second intensity value representing the second pixel group;

calculating a first ratio of a target intensity value to the first intensity value, and a second ratio of the target intensity value to the second intensity value;

determining a first adjustment value of the first pixel group based on the first ratio, and a second adjustment value of the second pixel group based on the second ratio; and obtaining a compensated intensity fluctuating pattern by multiplying the first adjustment value by the first intensity value and the second adjustment value by the second intensity value.

11. The image processing method of claim 10, wherein the first pixel group further includes a second first pixel, the first intensity value is a sum of intensity values of the first pixel and the second first pixel.

12. The image processing method of claim 10, wherein the first pixel group further includes a second first pixel, the first intensity value is an average of intensity values of the first pixel and the second first pixel.

13. The image processing method of claim 10, wherein the compensated intensity fluctuating pattern varies with an intensity range.

* * * * *